United States Patent [19]

Magnussen, Jr. et al.

[11] Patent Number: 4,616,514

[45] Date of Patent: Oct. 14, 1986

[54] REPLACEABLE TIP ASSEMBLY FOR PIPETTE

[75] Inventors: Haakon T. Magnussen, Jr., Pinole; Stephen J. Ruskewicz, Kensington, both of Calif.

[73] Assignee: Rainin Instrument Co., Inc., Emeryville, Calif.

[21] Appl. No.: 814,535

[22] Filed: Dec. 20, 1985

Related U.S. Application Data

[63] Continuation of Ser. No. 501,585, Jun. 6, 1983, abandoned.

[51] Int. Cl.[4] .............................................. G01N 1/14

[52] U.S. Cl. .............................. 73/864.14; 73/864.01; 73/864.16; 403/109; 403/369; 403/377

[58] Field of Search ........... 73/864.01, 864.14, 864.16; 403/368-371, 377, 378, 379, 109

[56] References Cited

U.S. PATENT DOCUMENTS

| | | | |
|---|---|---|---|
| 2,946,486 | 7/1960 | Gilmont | 73/864.14 X |
| 3,830,108 | 8/1974 | Spong | 73/864.14 |
| 3,873,274 | 3/1975 | Neisus | 73/864.16 X |
| 3,954,014 | 5/1976 | Andrews, Jr. et al. | 73/864.16 |
| 4,084,730 | 4/1978 | Franke et al. | 73/804.14 X |
| 4,099,548 | 7/1978 | Sturm et al. | 73/864.14 X |
| 4,257,267 | 3/1981 | Parsons | 73/864.14 |
| 4,406,170 | 9/1983 | Kühn | 73/864.16 |
| 4,418,580 | 12/1983 | Satchell et al. | 73/864.14 X |
| 4,435,989 | 3/1984 | Mayer et al. | 73/864.14 |
| 4,448,335 | 5/1984 | Jessop | 73/864.14 X |
| 4,567,780 | 2/1986 | Oppenlander et al. | 73/864.16 |

*Primary Examiner*—Stewart J. Levy
*Assistant Examiner*—Tom Noland
*Attorney, Agent, or Firm*—Townsend and Townsend

[57] ABSTRACT

A pipette is disclosed which includes a pipette body, a tip locking mechanism, and a disposable pipette tip. The pipette body has a plunger which reciprocates into and out of an interior air filled chamber. This air forces a measured amount of liquid into or out of the tip. After pipetting, an over-stroke of the plunger discharges a blast of air to assure discharge of all the fluid. In one embodiment, a further over-stroke unlocks a mechanism holding the shell in place and actuates tip disposal and replacement. The shell surrounding the pipette body is depressed by the plunger shaft. Fingers formed from the lower end of the shell are pushed outward by cam action with the pipette body. As the fingers spread, the tip falls free. A replacement tip is then attached. The fingers also define a funnel which guides the replacement tip on to the point where it snaps into position. The spring biased shell and fingers apply a uniform force holding the tip against a gasket at the end of the pipette body, and the shell is again locked in place.

26 Claims, 5 Drawing Figures

REPLACEABLE TIP ASSEMBLY FOR PIPETTE

This is a continuation of application Ser. No. 06/501,585, filed June 6, 1983, now abandoned.

FIELD OF THE INVENTION

The present invention relates to liquid measuring devices, and more specifically to automated pipettes having disposable tips.

PRIOR ART

Pipettes having reciprocating plungers and disposable tips are well known. Typically, the reciprocating plunger moves into and out of an air filled chamber inside the pipette body. Syringe action discharges a measured amount of air through the disposable tip as the plunger is depressed to its "home" position. The tip is then immersed in the liquid to be pipetted, and the plunger is allowed to return by spring action, drawing a measured amount of liquid into the tip. A buffer of air between the tip and the plunger prevents contamination by residual liquid from previous pipettings. When the pipette is positioned over a receptacle, the plunger is depressed again to its home position, and the liquid in the tip is dispensed. Overtravel, typically beyond an added spring bias, is used to send air through the tip to assure complete discharge of the liquid. After the air discharge, the end of the tip may be wiped against the receptacle. The plunger may then be allowed to return by spring action for another cycle. Such pipettes have been adequate, but there is a need for greater precision.

Prior art pipettes have typically relied on the user's sense of touch to detect the plunger home position stop. Sometimes the plunger is not sufficiently depressed and less than the intended measure of liquid is drawn in. At other times the plunger is depressed too far, and what should be the post-liquid air discharge portion of the plunger stroke results in too much liquid being drawn in. With prior art pipettes, operator error and fatigue have prevented the pipetting cyce from being precisely repeated.

Another problem has been in attaching and removing the disposable tips. Some prior art pipettes have employed a tip releasing mechanism actuated separately from the plunger shaft actuator. In addition, previous disposable tips have had a conical inside surface which fit over a nozzle on the pipette. If tips are stabbed onto the nozzle, they may or may not be rigidly secured. To attach tips uniformly users often use both hands, holding the pipette in one hand and the disposable tip in the other. If the outside of the nozzle becomes scarred through wear, the air seal is broken and pipetting is inconsistent. The usefulness of the pipette is lost and it must be replaced or repaired.

OBJECTS OF THE INVENTION

It is therefore an object of this invention to provide a pipette tip that may be secured to and released from a pipette body with one hand. The hand holding the pipette actuates the shell and gripping fingers which hold the disposable tips. Uniform and one-handed tip replacement is important because pipetting is typically done in a recurring sequence with many other laboratory manipulations.

Another object of this invention is to provide a pipette which may be automated by a digital linear actuator for the plunger and tip attachment mechanism. Not only does this minimize operator effort in replacing tips, but the automated actuator repeats the pipetting cycle precisely and the tips are uniformly gripped and positioned on the pipette.

An additional object of this invention is to provide a predictably stiff, durable, and uniform tip gripping mechanism by using tip gripping fingers made of arcuate and resilient spring biased plastic. The fingers can have tapered wall thicknesses to achieve increasing moment as the lever arm lengthens, and assure uniform flexure along the length of the fingers.

A further object of this invention is to provide a locking mechanism for the gripping fingers whereby, after liquid is discharged, the tip can be wiped on a receptacle and the resulting uneven stress will not offset the tip.

Yet another object of this invention is to provide a pipette wherein disposable tips are held against replaceable flat gaskets instead of a wearable pipette nozzle.

Yet another object of this invention is to provide a tip gripping mechanism that centers the disposable tip around the air passageway in the pipette body.

A further object of this invention is to provide a tip gripping mechanism that is actively helpful in detaching tips from the pipette body. The tip gripping fingers are biased inwardly towards the space otherwise occupied by the disposable tip. As tip disposal begins, friction between the fingers and the outside of the tip lifts the tip from the gasket.

Still a further object of this invention is to provide a pipette including the combination of a tip releasing mechanism, a disposable tip which seats on a replaceable flat gasket, and a tip gripping shell lock.

SUMMARY OF THE INVENTION

These and other objects are attained in the present invention by the provision of a disposable pipetting tip and a pipette body with a reciprocating spring biased outer shell. The shell defines several arcuate tip-gripping fingers. Inside the pipette body a positive displacement plunger reciprocates into and out of a chamber containing a volume of air. The displaced air is communicated by a passageway through a flat gasket which defines a bearing surface for a replaceable pipette tip. The replaceable tip has a rim which bears against this gasket. Adjacent to the rim the tip has a lip which is latched by the gripping fingers. These fingers have springs to hold the tip uniformly against the gasket. There is also a lock to hold the shell against the pipette body. An over-stroke of the plunger forces air through the passageway to assure discharge of all the pipetted fluid. In one embodiment of this invention the same plunger is depressed further to dispose of a tip. In another embodiment, the shell is independently depressed. This releases the shell locking mechanism, and a washer keyed to the plunger shaft depresses the shell. Midway along the length of each finger there is a ridge on the inside. The ridges together form an annulus. Moving the fingers down causes the ridges to ride out on a complementary notch formed in the pipette body, spreading the fingers away from the complementary lip on the disposable tip and releasing it. A replacement tip is then attached. Releasing the plunger causes the spring biased shell and fingers to apply a uniform force to the disposable tip, holding it against the gasket. Seating of the tip is indicated by a telltale click when the fingers latch over the lip. The shaft locking mechanism then locks the shell in place. Other objects, features and advantages of this invention will become more apparent after referring to the following specification and attached drawings.

DETAILED DESCRIPTION OF THE INVENTION

Figure 1A:
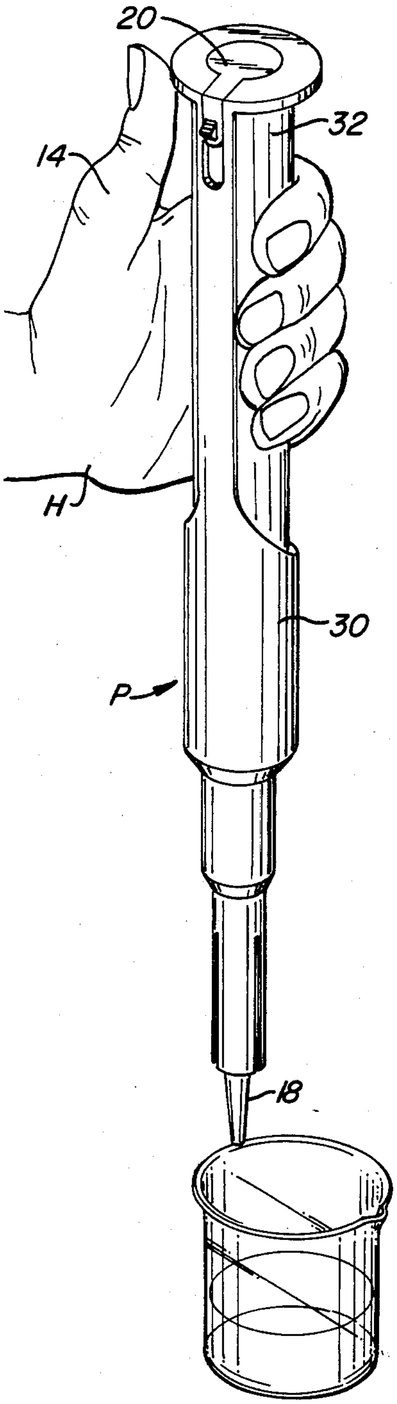
FIG. 1A is a perspective of a manual tip release embodiment of the pipette assembly of this invention held vertically in a user's hand.
Figure 1B:
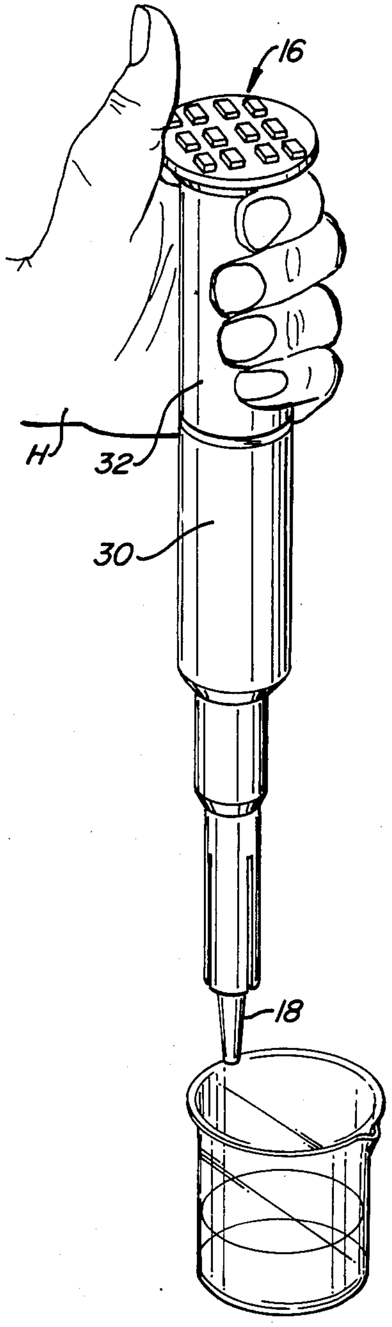
FIG. 1B is a perspective of a digitally actuated embodiment of the pipette assembly of this invention held vertically in a user's hand.

Referring to FIGS. 1A and 1B, a hand H is shown gripping the pipette P. By pressing thumb 14 onto the shaft 20 or the optionally automated controls 16 of this invention, liquid is pipetted to or from a receptacle.

Pipette P is considered in two sections. The first section, as shown in FIG. 1B, may use a motorized actuator which is the subject of U.S. Pat. No. 3,915,651 entitled "Direct Digital Control Pipette." Alternatively, the first section may by manually actuated as shown in FIG. 1A. The present application concerns a second section comprising the pipette body 32 and the disposable tip 18 shown in FIGS. 1A and 1B, and in FIGS. 2 through 4. It is within the ordinary skill of the art to connect the motorized actuator to the second section as described below.

Pipette body 32 is typically a telescope-like series of concentric hollow plastic cylinders. Upper cylinder 50 surrounds shaft locking mechanism 103 and holds spring retaining washer 54 by locking shoulders 55. Cylinder 50 has flexible wall sections 33 with recesses 31 for the shaft locking mechanism to be described. Cylinder 50 ends in a frustro conical portion 51. A second cylinder 56 surrounds compression coil spring 59 and ends at shoulder 57. Cylindrical section 21 defines the chamber 22 containing the volume of air which is displaced by plunger 28.

Like pipette body 32, the tip griping shell 30 is a series of concentric cylinders. Shell section 61 surrounds the shaft locking toggle mechanism 103 in body portion 50, and terminates in a frustro conical relief portion 62. Section 61 has projections 63 passing through slots in body 32. Section 65 surrounds pipette body section 56, and ends at a frusto conical portion 66.

Figure 3:
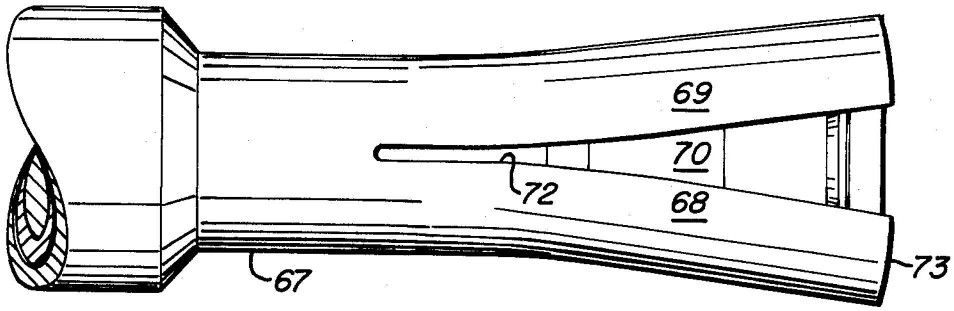
FIG. 3 is a perspective of the tip griping end of the invention illustrating the tip gripping fingers alone.

Shell section 67 includes the tip gripping fingers. The three resilient fingers 68, 69, and 70 are also shown in FIG. 3. The fingers are separated by three slots 72 which extend from the lower end 73 of shell 30 approximately ¾ to 4/5 the length of section 67. Inside finger section 67 there are two separate sets of cams. The first set of cams is a ridge 80 which pushes fingers 68–70 out as the ridges slide down the body. The second set of cams is hooking annulus 90 which holds the disposable pipette tips 38 to pipette body 32.

Fingers 68–70 together define the first set of cams, a ridge 80 having release slopes 82. Pipette body 32 defines a complementary notch 84 having a release slope 86. By up and down movement of shell wall 63 and thus finger section 67, the fingers will move between the outward position shown in the right of FIG. 2 and the inward position shown in the left of FIG. 2.

The second set of cam surfaces defined by the fingers is an annular hook. On the end of each finger there is a hook 90 which has a funnel surface 92 and a tip locking surface 94. When a disposable pipette tip 38 is pushed between funnel surfaces 92 and the fingers are not spread, lip surface 121 will move the finger surface 92 outwardly. The fingers latch over the lip with an audible "click," and locking surface 94 locks the complementary locking surface 122 on lip 120. This holds disposable tip 38 against gasket 36. Each of the three fingers 68, 69 and 70 defines a segment of ridge annulus 80 and of hooking annulus 90. When brought together the fingers define two essentially continuous annuluses. The hooks 90 enclose and press upon disposable tip 38. If tip 38 is removed the annular hook will form a circumference less than that of rim 118 on tip 38. Thus, as shell 30 begins to move from the position shown in the bottom of FIG. 2 to the position shown in the top of FIG. 2, friction between the fingers and the tip 38 will assist in removing the tip.

Disposable pipette tip 38 includes a frustro conical pipetting volume 112 surrounded by frustro conical sidewalls 114. Volume 112 terminates in an aperture 116. At its upper, larger end, pipette tip 38 has a rim 118 with a lip 120. Lip 120 has a surface 121 complementary to the funnel surfaces 92 on the fingers 68–70. Locking surface 122 on the disposable tip is complementary to the finger locking surfaces 94. These locking surfaces secure the disposable tip 38 against replaceable gasket 36.

The volume 112 of the pipetting tip is proportioned to the volume of the chamber 22. When volume 112 is almost full of liquid, no more air may be drawn into the chamber 22. This air barrier assures that liquid does not touch passageway 34 or gasket 36, and avoids contamination of pipetted liquids.

A linearly actuated shaft 20 reciprocates up and down, displacing air or liquid out of and drawing it into chamber 22. Shaft 20 has keyed thereto key ring 25 and washer 26. As will be described, in one embodiment washer 26 bears against outer shell 30 via projections 63. Higher up, shaft 20 has a releasing cam 111 which moves with the shaft to operate the locking mechanism 103, to be explained. Shaft 20 includes plunger 28 which is typically made of metal which forms a seal as tight as possible against a conformable plastic seal ring mechanism 40, to be more fully described. The lower end of chamber 22 is vented by passageway 34 through a circular gasket 36. The rim 118 of the disposable pipette tip seats on gasket 36 to form a seal.

Guide 42 and seal 44 surround plunger 28. Guide 42 is a hollow cylinder with a recess 43 against which a spring 59 is seated. Spring 59, which is coiled around shaft 20, bears at the upper end against washer 54, and at the lower end pushes guide 42 and seal 44 downward. Seal 44 has an "L" cross-section. One leg of the L abuts plunger 28, and the other abuts guide 42.

Inside the corner of L-shaped seal 44 is an O-ring seal 46. Typically, O-ring 46 has sufficient hoop tension to urge seal 44 onto the sidewalls of plunger 28. Meanwhile spring 59 urges guide 42 and seals 44 and 46 downwardly against shoulder 57 on the inside of pipette body 32. Thus, a precision air-tight chamber 22 is formed, into which plunger 28 can penetrate freely but which is isolated by O-ring 46 from air outside the pipette body 32.

Spring 100 bears between washer 26 and washer 54 which in turn bears on spring 59. Spring 102 bears between washer 54 and projection 63 of shell 30 causing the fingers 68–70 to pull tip 38 uniformly onto replaceable gasket 36.

Figure 4:
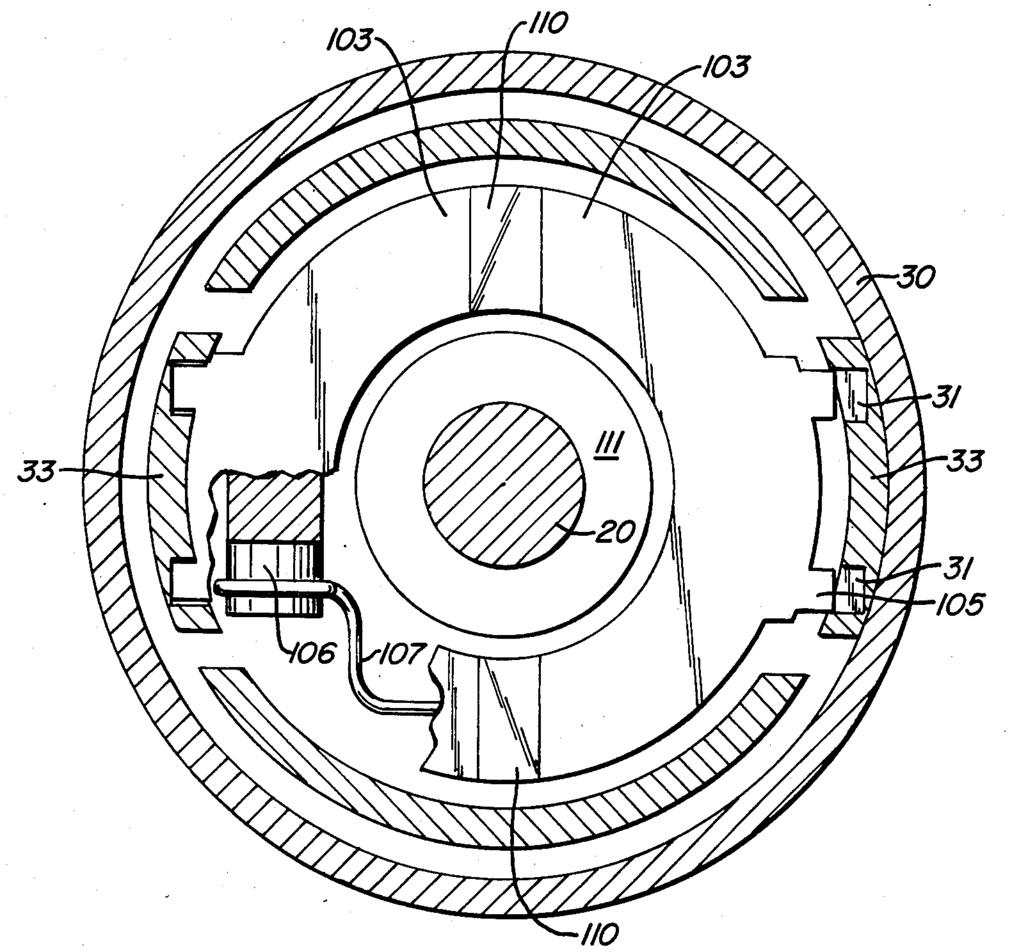
FIG. 4 is a parly cut away top view of the shell locking mechanism.

As also shown in top view FIG. 4, the upper portion of pipette body 32 has flexible tab portions 33 in which there are recesses 31. Protuberances 105 from toggles 103 fit into recesses 31 and keep the toggles from slipping up or down inside the pipette body 32. Toggles 103 include a pair of semi-circular sections 104 which may have a ball 108 on one end and a complementary socket 109 on the other. The ends of the two sections fit together to form a pair of joints or hinges 110. The radii of sections 103 including the protuberances are slightly larger than would allow hinge 110 to unfold completely within the inside diameter of cylinder 50. Toggles 103 also each have a bell crank 106 extending generally perpendicularly from sections 104. Cranks 106 are linked by tension spring 107 which pulls the cranks inward. Shaft 20 has an annular cam 111.

Figure 2:
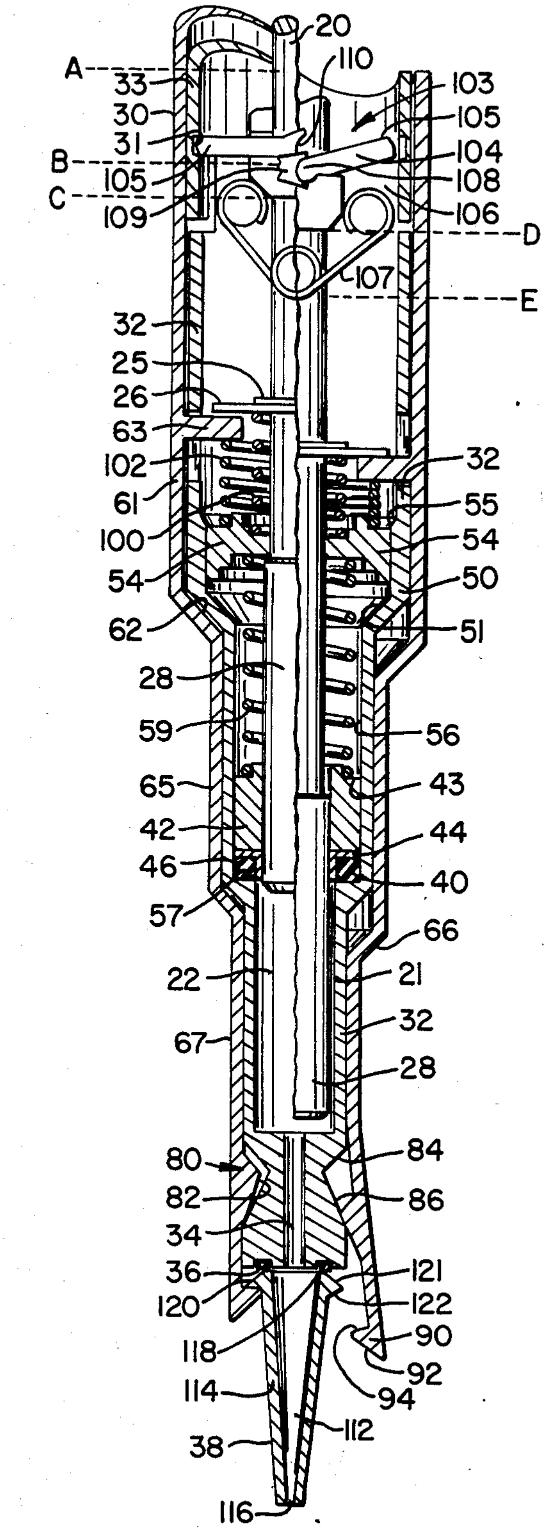
FIG. 2 is a cutaway of the pipette body with the plunger sectioned down the middle to show the plunger in the air chamber and one of the fingers spread on the top, and the plunger retracted and one of the fingers latched onto the tip on the bottom.

Operation of the invention is explained with reference to FIGS. 2 and 3. In the liquid measuring part of the pipetting cycle with reference for example to the bottom of cam 111, shaft 20 starts at a set position "A." The plunger displaces a measured amount of air, which depends on the starting point, as it descends to its home position "B." The tip is immersed in a liquid, and the plunger is released. As the plunger rises back up to point "A," a measured amount of liquid is drawn into the tip 38. To discharge the liquid, the plunger is again depressed to point "B." The cycle may be repeated, or if it is desired to change tips, shaft 20 will be depressed beyond the shell locked position "C". At point C, cam 111 wedges between cranks 106. This increases the supplementary angle between the pair of sections 104, decreasing their overall diameter and withdrawing flex sections 33. In one embodiment, when shaft 20 is depressed further to shell-unlocked point "D," ring 25 will begin to move washer 26 and shell 30 down. In another embodiment, shell 30 is depressed independently by the user's thumb. The tip release begins with hooks 90 touching the tip. Typically, friction will lift the tip free of gasket 36. Then ridge slopes 82 on the fingers will ride up on notch slope 86, and when the shaft is at tipreleased position "E," the disposable tip 38 will drop free.

Tips are attached by the reverse process. Typically, shell 30 will have retracted somewhat relative to the pipette body 32, and the fingers will be close to gasket 36. The new tip 38 will be pushed between the guide funnel surfaces 92 of the fingers. Surfaces 92 and 121 on the fingers and on the lip, respectively, snap lock as they pass over center with respect each other. Once the tip is locked in position, shaft 20 may be allowed to spring back up. Compressed coil spring 102 will apply a uniform tension which holds tip 38 onto the washer 36 and prevents leakage therebetween.

When the plunger stroke is reversed and a new tip 38 is in place, further upward movement of shaft 20 past point "D" moves cam 111 out from between cranks 106. Spring 107 pulls the cranks in, which flattens out hinge 110. At point "C" protuberances 105 impinge upon recesses 31 of tab portions 33, which contacts shell 30. Static friction holds shell 30, and hence fingers 68–70, in place. Sideways pressure applied to tip 38 in wiping off a drop of liquid will not result in shell 30 sliding off center or the tip breaking the seal.

The attachment and release of the disposable tips may be done by either a digital linear actuator as described in the cited patent, or manually by the user's thumb directly depressing shell 30. With changes of size in plunger 28, corresponding changes occur in pipetting volume 112. The frustro conical interior shape herein disclosed could be replaced by other shapes. Pipette bodies and replaceable tips having volumes from 20 microliters to as high as 5000 microliters may be interchanged. Similar departures can be made from the other aspects of this invention as limited only by the following claims.

What is claimed:

1. In a pipetting assembly of the type wherein a plunger reciprocates into and out of a chamber in a pipette body to displace air through a passageway to a detachable pipetting tip, the improvement comprising:
- tip attachment means including a shell slidably disposed around said pipette body and including a plurality of spring biased flexible fingers having hooks for gripping said pipetting tip; and
- annular tip sealing means disposed around said passageway at a lower end of said pipette body.

2. The invention of claim 1 wherein said pipetting tip is in the shape of a hollow cone having an aperture at its apex, an open base with a planar rim, and a circumferential triangular lip having one side contiguous with the outside of said cone.

3. The invention of claim 2 wherein said hooks engage said lip.

4. The invention of claim 3 including annular notch and ridge surfaces in said pipette body and on said fingers, respectively, whereby reciprocation of said shell relative to said pipette body causes said fingers to spread away from said detachable pipetting tip.

5. The invention of claim 4 including key ring means attached to said plunger whereby reciprocation of said plunger into said chamber past a shell-unlocked point causes said fingers to spread.

6. The invention of claim 5 further including a shaft locking mechanism actuated by an inner shaft plunger reciprocating along its axis to lock a coaxial middle shaft body relative to a coaxial outer shaft shell, said mechanism comprising:
- a pair of semicircular sections disposed around said inner shaft and inside said middle shaft, said sections terminating in hinge means between said sections, each said section having on its radially outer side at least one protuberance which impinges upon said middle shaft preventing said sections from unfolding completely into a single plane;
- said middle shaft having flexible locking means, including recesses complementary to said protuberances, to hold said outer shaft by static friction when force is applied to said locking means by said protuberances;
- hinge opening means extending radially from said inner shaft which, upon reciprocation of said inner shaft, apply pressure tending to open said hinge means causing said sections to flatten relative to each other and said protuberances to push said recesses outward to lock said middle shaft against said outer shaft.

7. The combination of claim 6 wherein said hinge opening means includes a cam which bears against said hinge.

8. The combination of claim 6 wherein said sections each include a crank extending approximately parallel to said axis from the middle of a planar side of said section, and also includes tension spring means to pull said cranks together, and wherein said hinge opening means includes a cam which upon reciprocation of said shaft wedges between and forces apart said cranks thus forcing said hinge to open reducing the angle supplementary to the angle between said sections and increasing their outside diameter to force said protuberances against said locking means.

9. The combination of claim 6 wherein said sections terminate at opposite ends in a ball joint and in a corresponding socket joint, and said hinge means is formed from said ball and socket joints.

10. The invention of claim 4 wherein the thickness of said fingers increases with increasing distance from said hooks.

11. The invention of claim 4 wherein said shell is manually reciprocated independently of reciprocation of said plunger.

12. The invention of claim 2 wherein said detachable tip has a flat gasket disposed on said rim.

13. The invention of claim 1 wherein said tip sealing means comprises a gasket.

14. A shaft locking mechanism actuated by an inner shaft reciprocating along its axis to lock a coaxial middle shaft relative to a coaxial outer shaft, said mechanism comprising;

a pair of semicircular sections disposed around said inner shaft and inside said middle shaft, said sections terminating in hinge means between said sections, each said section having on its radially outer side at least one protuberance which impinges upon said middle shaft preventing said sections from unfolding completely into a single plane;

said middle shaft having flexible locking means, including recesses complementary to said protuberances, to hold said outer shaft by static friction when force is applied to said locking means by said protuberances;

hinge opening means extending radially from said inner shaft which, upon reciprocation of said inner shaft, apply pressure tending to open said hinge means causing said sections to flatten relative to each other and said protuberances to push said recesses outward to lock said middle shaft against said outer shaft.

15. In a pipetting assembly of the type wherein a plunger reciprocates into and outer of a chamber in a pipette body to displace air through a passageway to a detachable pipetting tip, and having tip attachment means including a shell slidably disposed around said pipette body, said shell having a plurality of spring biased flexible fingers with engaging hooks for gripping said pipetting tip to said pipette body, the improvement comprising:

a detachable pipetting tip having the shape of a hollow cone with an open base seatable around said passageway and an aperture at the cone apex for discharging fluids from said pipetting assembly;

said open base having a conformably configured seating rim for forming a seal around said passageway, and having a circumferential annulus engageable by said hooks whereby said rim is held in sealing relation around said passageway.

16. The invention of claim 15 wherein said annulus is disposed on the outside of said cone for gripping by said hooks.

17. In a pipetting assembly wherein a plunger reciprocates into and out of a chamber in a pipette body to displace air through a passageway to a detachable pipetting tip and wherein said assembly includes tip attachment means including inner and outer relatively slidable cylindrical members, said members including means adjacent said passageway for gripping said detachable pipetting tip, the improvement comprising:

a locking member for inhibiting relative sliding movement of said cylindrical members to lock said detachable pipetting tip around said passageway, said inner cylindrical member including at least one biasable wall section movable between an unbiased first position wherein said cylindrical members are free to move with respect to each other, and a biased second position where said biasable wall section is in frictional contact with said outer member; and lever means responsive to movement of said plunger to engage said biasable wall section to lock and unlock said cylindrical members relative to each other.

18. In a pipetting assembly of the type wherein a slidable cylindrical shell having tip gripping fingers surrounds a cylindrical pipette body and said shell slides between a tip-gripped position wherein said fingers grip a detachable tip against said pipette body and a tip-released position where said fingers are disengaged from said tip, lock means comprising:

a flexible portion in said pipette body; and lever means having a first end disposed to be swung between a shell-locked position where said lever is relatively perpendicular to, and forces said flexible portion against, said shell to lock said shell by static friction, and a shell-unlocked position where said lever is relatively less perpendicular to, and does not force said flexible portion against, said shell.

19. A pipetting assembly of the type and as in claim 18 wherein said cylindrical pipette body includes along its central axis a reciprocating center shaft which moves relative to said body from a point where said shaft causes said lever to be in said shell-locked position, to a point where said shaft causes said lever to be in said shell-unlocked position.

20. A pipetting assembly as in claim 19 wherein said lever means is at least one semicircular section disposed around said center shaft and inside said inner shaft, and said semicircular section includes a crank extending approximately perpendicularly to said center shaft from the middle of a planar side of said section.

21. The combination of: a pipette body defining a chamber and having a plunger which reciprocates into and out of said chamber, a passageway communicating between said chamber and an outlet from said body; a detachable pipetting tip, tip attachment means including a slidable shell disposed around said pipette body and including a plurality of spring biased flexible fingers having means for latching said detachable tip and holding said tip in sealing relation around said passageway outlet, said slidable shell including locking means for locking said shell from sliding movement relative to said pipette body and to secure said detachable tip around said outlet, said locking means releasable to release said detachable tip in response to movement of said plunger.

22. A detachable pipetting tip substantially in the shape of a hollow cone having an aperture at its apex, an open base with a planar seating rim to be engaged with a gasket, said rim adjacent the interior surface of said tip, and a circumferential lip adjacent said rim, said lip formed at the base end of said cone shaped pipetting tip by first extending the outer surface of the tip out from the rim at an acute angle to the plane containing said open base and rim a distance external to where the exterior surface would be if the tip were shaped precisely like a hollow cone and thereafter extending the outer surface at a different angle back to where the exterior surface would be for the exterior surface of said precisely shaped hollow cone, the orientation of both said angles being such that the termination locus of each extension is located between parallel planes containing respectively the base and apex, the originating position of the first extension being in the base plane, said lip thereby engageable for securement of said tip to a pipette body.

23. In a pipetting assembly wherein a plunger reciprocates within a chamber along an axis of a pipette body to displace fluid through a passageway in fluid communication with the interior of a detachable pipetting tip means having a first end proximal to said pipette body and an aperture at a second end distal from said pipeette body, the improvement comprising:

tip attachment means associated with said pipette body having a radially movable tip locking surface; and a lip on the exterior of said detachable pipetting tip means having a locking surface;

said tip means being attachable by axial movement to engage said tip attachment means so that said first end of said tip means abuts said pipette body, whereby said tip attachment means snap locks with said tip means in that said tip locking surface of said tip attachment means initially moves radially away from said axis and thereafter radially toward said axis for engaging said locking surface of said lip of said tip means.

24. The pipetting assembly of claim 23 wherein said first end of said detachable pipetting tip means has a rim, and further comprising a gasket interposed between said pipette body and said rim, said rim bearing against said gasket upon attachment of said tip means to form an air-tight seal between said tip means and pipette body.

25. The pipetting assembly of claim 23 wherein said tip attachment means has a funnel surface and said detachable pipetting tip means has a lip surface complementary to said funnel surface, said lip surface engaging said funnel surface so that said tip locking surface is moved radially outwardly when said tip means is moved axially into contact with said tip attachment means.

26. A detachable pipetting tip means having a first end to be engaged with a pipette body and an aperture at a second end distal from said pipette body, a chamber being located interior of said pipette body along an axis of said pipette body wherein a plunger reciprocates to displace fluid through a passageway in fluid communication with the interior of said detachable pipetting tip means when said detachable pipetting tip means is attached to said pipette body by tip attachment means associated with said pipette body having a radially movable tip locking surface, comprising:

a lip on the exterior of said detachable pipetting tip means having a locking surface;

said tip means being attachable by axial movement of said tip means to engage said tip attachment means so that said first end of said tip means abuts said pipette body, whereby said tip attachment means snap locks with said tip means in that said tip locking surface of said tip attachment means initially moves radially away from said axis and thereafter radially toward said axis for engaging said locking surface of said lip of said tip means.

* * * * *